United States Patent [19]

Kastella et al.

[11] Patent Number: 5,451,960
[45] Date of Patent: Sep. 19, 1995

[54] METHOD OF OPTIMIZING THE ALLOCATION OF SENSORS TO TARGETS

[75] Inventors: Keith D. Kastella, Woodbury; Wayne W. Schmaedeke, Eden Prairie, both of Minn.

[73] Assignee: Unisys Corporation, Blue Bell, Pa.

[21] Appl. No.: 257,974

[22] Filed: Jun. 10, 1994

[51] Int. Cl.⁶ ........................ G01S 13/06; G01S 13/72
[52] U.S. Cl. ............................... 342/59; 342/97; 342/195
[58] Field of Search ............... 342/59, 95, 97, 107, 342/140, 147, 156, 195

[56] References Cited

U.S. PATENT DOCUMENTS

| | | | |
|---|---|---|---|
| 3,935,572 | 1/1976 | Broniwitz et al. | 342/80 |
| 3,952,304 | 4/1976 | Broniwitz et al. | 342/95 |
| 4,148,029 | 4/1979 | Quesinberry | 342/106 |
| 4,179,696 | 12/1979 | Quesinberry et al. | 342/75 |
| 4,783,744 | 11/1988 | Yueh | 364/454 |
| 5,331,562 | 7/1994 | McGuffin | 364/449 |

OTHER PUBLICATIONS

Nash, J. M., "Optical Allocation of Tracking Resources," *Proceedings of IEEE Conference on Decision and Control*, 1977, pp. 1177–1180.

*Primary Examiner*—John B. Sotomayor
*Attorney, Agent, or Firm*—Glenn W. Bowen; Mark T. Starr

[57] ABSTRACT

Target tracking basic sensors are used alone or in multi-sensor combination for multi-target surveillance systems. Optimal assignment of targets to pseudo sensor combinations of single basic sensor groups or to sensor groups formed of a plurality of basic sensors is provided subject to given constraints on basic sensor capacity for a given definition of optimal. The approach taken here is to determine the predicted gain in information content of a track i after it is updated with data from pseudo sensor i for all pairs i,j. This information content is then used to predict without making actual observations by using the properties of the Kalman covariance matrix. Assignments of tracks to pseudo sensors are then made on a continuing basis so that the total information gain is maximized. This is achieved by imposing unique constraints on the pseudo sensors and then calculation maximized information gain using linear programming methods.

1 Claim, 2 Drawing Sheets

METHOD OF OPTIMIZING THE ALLOCATION OF SENSORS TO TARGETS

FIELD OF THE INVENTION

This invention relates to multi-sensor, multi-target radar surveillance systems and in particular to the optimal assignment of targets to sensors in such systems.

BACKGROUND OF THE INVENTION

The problem of allocating of multiple sensors for the surveillance of multiple targets advanced in radar systems are formidable. The sensors are often of different types and are usually located on different platforms while the surveillance is confined to a particular Volume of Interest (VOI). Target ranking, spatial and temporal coverage, conversion of assignments into sensor control commands, immunity to countermeasures, emission control, cueing and handoff, event prediction, and the ability of sensors to observe targets are among the many complicated aspects of the problem. Prior allocation methods were often ad hoc and sub-optimal.

The mathematical foundations of the invention are shown in equations 1–5 below. Let X be a discrete parameter space with a finite number of parameters. The most general way of describing any state of information on X is by defining a probability measure of $\mu$ that extends over X. The most familiar case is when $\mu$ is a probability for a given state of information and f(x) is its corresponding probability density function. Thus for any $A \subseteq X$, where A is equal to, or is in, the set X, we have $$\mu(A) = \int_A d\vec{x} f(\vec{x}) \qquad (1)$$

The probability density function $f(\vec{x})$ is said to represent the state of information. Each track process is described by a Kalman filter. It is a property of the Kalman filter that one can, a priori, calculate the updated covariance matrix for the target, if it is assumed that a selected sensor will be used to observe or track the state vector. The form of the uncertainty of the components of the state vector $\vec{x}$ is selected as a gaussian multi-variate distribution. The form of the density function $f(\vec{x}; \vec{m}, P)$ is then given by $$f(\vec{x}, \vec{m}, P) = ([2\pi]^{n/2}[\det P]^{\frac{1}{2}})^{-1} \exp(-\tfrac{1}{2}[\vec{x}-\vec{m}]^T P^{-1}[\vec{x}-\vec{m}]) \qquad (2)$$

where $\vec{m}$ is the mean vector of the state and P is the covariance matrix. The mean vector $\vec{m}$ is the most probable value of the state and the covariance matrix P is a symmetric matrix whose diagonal elements are the variances of the components of the state vector. In order to evaluate the efficacy of assigning a sensor to a target, we choose to use the predicted information content of the state vector as a comparative measure of how to make the best assignment.

The relative information content $I(f,\lambda)$ of a probability density function $f(\vec{x})$ with respect to the (normalized) non-informative probability density $\lambda(\vec{x})$ is given by:

$$I(f,\lambda) = \int d\vec{x} f(\vec{x}) \ln (f(\vec{x})/\lambda(\vec{x})) \qquad (3)$$

and is simply called the information content of $f(\vec{x})$. When the logarithm is to the base 2, the unit of information is termed a bit; if the base is $e = 2.71828\ldots$, the unit is the nep or neper; and when the base is 10 the unit is the digit. It is known that $I(f,\lambda)$ is invariant under a change of variables that is one-to-one and onto (called bijective). It is also known that $\lambda$ is a uniform probability density if the coordinate system is Cartesian.

If sensors are assigned to observe the state vector $\vec{x}$, then the new updated covariance matrix will be called $P_1$, while the updated covariance matrix if the state vector is not observed will be called $P_o$. The density function for the one step ahead (i.e., one calculation cycle) state vector if the track is observed by a sensor is $f_i(\vec{x}; \vec{m}_1, P_1)$. The density function for the one step ahead updated state vector if the track is not observed by a sensor is $f_o(\vec{x}; \vec{m}, P_o)$. When the information gain in the one step ahead state vector for a track T is the difference in the information content if the track is observed minus the information content if the track is not observed. This "gain" in information can be denoted by G where $$G = I(f_1, \lambda) - I(f_o, \lambda) \qquad (4)$$

The notation for the gain in assigning sensor i to track j is obtained by subscripting the gain as $G_{ij}$. If the density functions are Gaussian, we can then evaluate I in closed form, and, therefore, also G to obtain for the gain in information content, the expression $$G = \tfrac{1}{2} \ln \left[ \frac{|P_0|}{|P_1|} \right], \qquad (5)$$

where the notation $|P|$ stands for the determinant of P and the unit is the neper.

The use of Kalman filters to obtain preferred sensor-to-target assignments in a generic surveillance context is known. Jeffrey M. Nash's article in *Proceedings of the IEEE Conference on Decision and Control*, 1997 entitled "Optimal Allocation of Tracking Resources" discusses an approach to the general problem. The Nash paper utilizes pseudo sensors in addition to the original independent sensors in which the pseudo sensors are provided for all possible sensor combinations. The Kalman filter is utilized to provide the covariance matrices $P_1$ and $P_0$ which are used in G to calculate the gains in information content which can then be presented in an augmented sensor target assignment array in which the targets 1–n are aligned in a row across the top of the array, and the sensors 1–m are aligned in a column on the left side of the array. Thus there will be formed $n \times m$ cells in the array, and a maximum information gain and associated sensor to target assignment will be calculated by a digital computer using a linear programming algorithm on a step-by-step basis. The assignment thus obtained is the optimal assignment in the sense of maximum gain of information.

SUMMARY OF THE INVENTION

Allocation of multiple sensor as single basic sensor "pseudo sensors" or as collections of basic sensors to form additional pseudo sensors to multiple targets is achieved for a radar surveillance system by determining the predicted gain in information content of a track i after it is updated with data from pseudo sensor j for all pairs of tracks and pseudo sensors i,j. This information content is predicted by using a Kalman covariance matrix data for each target track. The particular assignment of tracks to pseudo sensors that maximizes the total information gain subject to the constraints on basic sensor capacities is generated by a software process that implements the mathematical technique of linear programming.

TECHNICAL DESCRIPTION OF THE INVENTION

The invention will be described with reference to a surveillance problem in which there are s pseudo sensors and t targets or tracks. In the assignment of a pseudo sensor to a target we assume that each pseudo sensor is described by a Kalman filter covariance matrix which provides the errors the basic sensors make in measuring various features related to a target's state vector.

Figure 1:
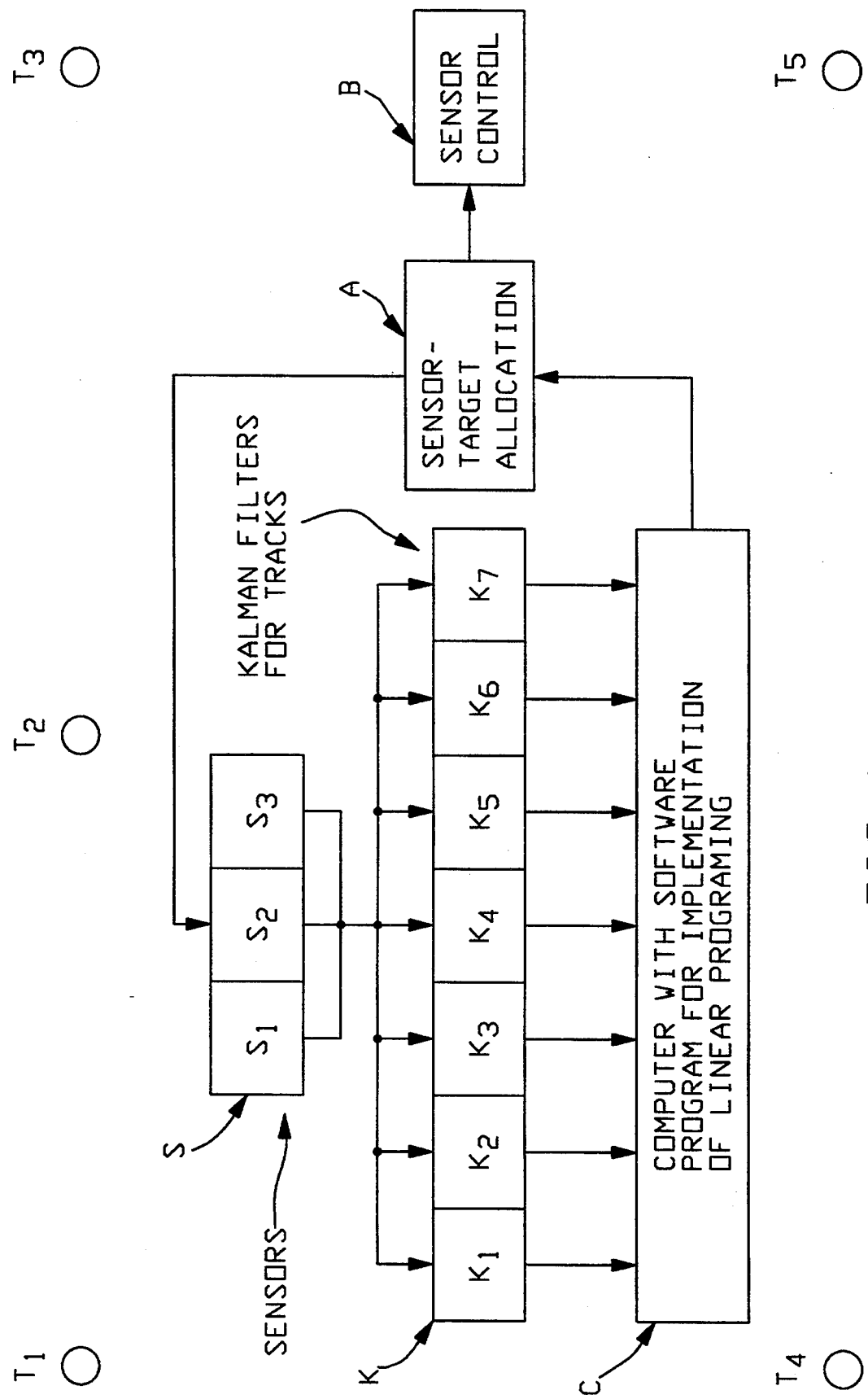
FIG. 1 is a schematic block diagram of a system in accordance with the present invention.

FIG. 1 is a block diagram of a representative embodiment of the present invention in which five targets $T_1-T_5$ are the targets that are to be tracked. The system uses three independent basic, or actual, sensors $S_1-S_3$. In addition to the three basic sensors, four other sensor groups are formed $S_4-S_7$. Three of these sensor groups, $S_4$, $S_5$ and $S_6$, are formed by utilizing the various combinations of the basic sensors $S_1$, $S_2$ and $S_3$ taken two at a time. The seventh sensor group is then formed with a combination of all three sensors $S_1-S_3$. There are then seven possible sensor groups to target tracks assignments that may be formed since a sensor group may consist of only a single basic sensor. Each group of sensors, whether formed of a single sensor or a plurality of sensors, may be called either a "pseudo sensor" or a "sensor" in this document, where the context will make the meaning or the term apparent. Each track has a Kalman filter assigned to it in the described embodiment. These gain serials are then utilized by a digital computer C which receives the information from the Kalman filters $K_1-K_5$ and utilizes a software program to implement mathematical linear programming in a manner which will maximize the information gain on a continuing step-by-step basis. In this manner the assignment of pseudo sensors to targets is resolved in the most efficient tracking procedure on a substantially real-time basis. The results of the computer are utilized by the pseudo sensor target assignment controller A to update the pseudo sensor combinations on a step-by-step updated basis and to provide the results to the sensor control B. FIG. 1 is only a schematic and it is to be realized that all of the pseudo sensors are coupled to suitable known antenna or antenna arrays so that any of the pseudo sensors may track any of the targets which are in their fields of view.

Figure 2:
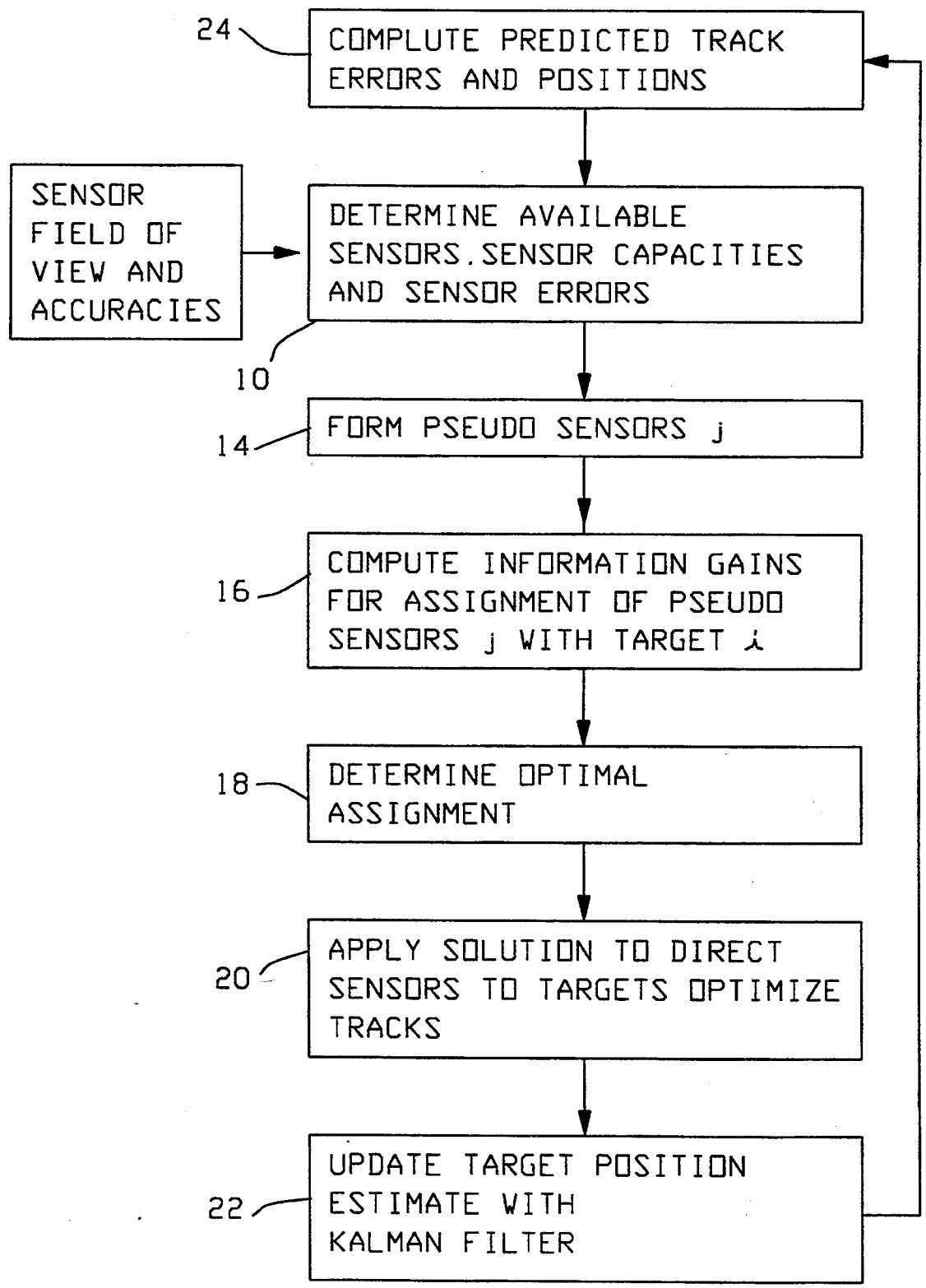
FIG. 2 is a block diagram of the process of optimization by which information gain is obtained with the invention.

FIG. 2 illustrates the process in which the method of optimizing the allocation of sensors to targets in radar surveillance systems in which the present invention is employed. In systems in which multiple pseudo sensors are allocated to multiple targets, the available basic sensors, the capacity of each basic sensor and the capability of the basic sensors for producing errors must first be determined, and this information must be supplied to the data processing resources of the system, as indicated in step 10. This information is derived from information obtained from the basic sensors, such as the fields of view and the accuracies indicated in step 12.

Once this information is known, data received from the basic sensors are combined by implementation of equation 8 to form additional "pseudo sensors," as indicated in step 14. A process of constructing and attempting to optimize pseudo sensors was described by J. M. Nash in the article "Optimal Allocation of Tracking Resources," Proceedings of IEEE Conference on Decision and Control, 1977, pp 1177–1180. The method of step 14 allows for the combination of basic sensors which is assigned to a single target by considering that the combination of basic sensors is a single pseudo sensor which is assigned to the target. The number of "sensors" employed is thus increased from S to $2^s-1$.

Once the optimal pseudo sensor to target assignment is obtained, it can be employed to observe the various targets returned tracks if the Kalman filter for each target is then employed to update the filter, based on the observation. Following updating of the Kalman filter, information is utilized to compute predicted track errors and positions. There are constraints, however, on the assignment of pseudo sensors. One of the most important constraints is the maximum tracking capacity of the basic sensors. Given a specified time interval, some sensors can observe a certain volume of space and also track a specified number of targets. They cannot exceed this maximum tracking capacity in the specified time period. If the maximum tracking capacity is known for each of the basic sensors, then this must be accounted for when the pseudo sensors are assigned. Prior work in this area did not achieve the desired optimization because it did not adequately address the pseudo-sensor constraints.

The process of this invention relies on information gain that is obtained by the assignment of the pseudo sensors as calculated by use of the equation 5 in step 16. The optimization method of step 18 of this invention then assigns pseudo sensors to targets in such a way that the one step-ahead gain in information content of the track set is maximized. To do this, the one step ahead predicted gain in information content $G_{ij}$, of a track j after it is updated with covariance data from pseudo sensor i is determined for all pairs i, j. This can be formulated as a linear programming problem with suitable constraints, where the constraints are handled as follows.

Let the basic sensors be numbered from 1 to s. Let the pseudo sensors be numbered from $s+1$ up to $2^s-1$. For each basic sensor k, let J(k) be the set of integers consisting of k and the integer numbers of the pseudo sensors which contain sensor k in their combination. There will be $2^{s-1}$ integers in each set J(k). These sets J(k) will appear in the constraints that are given for the linear programming formulation to our optimal assignment problem.

We can now state the linear programming problem. It is to:

$$\text{maximize } C = \sum_{i=1}^{2^s-1} \sum_{j=1}^{t} G_{ij}x_{ij}, \qquad (6)$$

where C is the maximum relative gain in a cycle, and equation 6 is subject to the following constraints which are generated from the pseudo sensor assignments. The first constraints are:

$$\sum_{i=1}^{2^s-1} x_{ij} \leq 1 \text{ for } j = 1, \ldots, t \qquad (7)$$

$$x_{ij} \geq 0 \text{ for all pairs } ij \qquad (8)$$

These constraints require that the quantity on the left side of the equation is equal to 0 or 1. In other words, each of the columns of the pseudo sensor\target matrix of Table I can only have a single "1", or it may have all "0" states, where "1" means a pseudo sensor is assigned and means no pseudo sensor is assigned. Also, the solution must satisfy:

$$\sum_{i \epsilon J(k)} \sum_{j=1}^{t} x_{ij} \leq \tau_k \text{ for } k = 1, \ldots, s \qquad (9)$$

where $\tau_k$ is the maximum tracking capacity of the basic sensor k.

This constraint means that the row designator of the matrix is determined by the J(k) set for a given pseudo sensor k for the second summation while the column designator of the matrix varies from 1 to 0's for the first summation.

Equation 6 in the present invention provides a maximized information gain function which is based upon the evaluation of equation 5 by the digital computer. This maximized gain function is different from the "sensor cost" function of the Nash article. The double integrated function of equation 6 does have some similarities to the double integrated function of the Nash article in that the state vector $X_{ij}$ is utilized and the $G_{ij}$ replaces the "c" (from the sensor cost function) of the Nash article. The constraints which are imposed in the evaluation of the linear program represented in equations 7, 8 and 9 are entirely different from those used by Nash, however. The result is a substantially improved sensor and target optimization system.

The linear programming problem of equation 6 under the constraints of equation 7, 8 and 9 may be evaluated by standard linear programming methods. Illustrations of a three basic sensor, five-target example problem using a linear programming method implemented with a commercial program called Mathematica ™ which is available from Wolfram Research are shown in the Appendix. This implementation incorporates the Kalman filter P, Q and R variances associated with track, sensor and process noise variances.

The implementation of the evaluation of equation 6 can be better understood by reference to the following Table I.

TABLE I

|   | T1 | T2 | T3 | T4 | T5 |
|---|---|---|---|---|---|
| S1 | $X_{11}$ | $X_{12}$ | $X_{13}$ | $X_{14}$ | $X_{15}$ |
| S2 | $X_{21}$ | $X_{22}$ | $X_{23}$ | $X_{24}$ | $X_{25}$ |
| S3 | $X_{31}$ | $X_{32}$ | $X_{33}$ | $X_{34}$ | $X_{35}$ |
| S4 | $X_{41}$ | $X_{42}$ | $X_{43}$ | $X_{44}$ | $X_{45}$ |
| S5 | $X_{51}$ | $X_{52}$ | $X_{53}$ | $X_{54}$ | $X_{55}$ |
| S6 | $X_{61}$ | $X_{62}$ | $X_{63}$ | $X_{64}$ | $X_{65}$ |
| S7 | $X_{71}$ | $X_{72}$ | $X_{73}$ | $X_{74}$ | $X_{75}$ |

In this table $S_1$, $S_2$ and $S_3$ are the basic sensors (and hence also are pseudo sensors), and $S_4$, $S_5$ and $S_7$ are additional pseudo-sensors. $T_1$, $T_2$, $T_3$, $T_4$ and $T_5$ are targets. The values $X_{11}$, $X_{12}$, $X_{13}$, etc., represent the corresponding state vector value $X_{ij}$ of the table where i represents the pseudo sensor number and j represents the target number.

With this implementation, the constraint equation 7 for j = 1 becomes:

$$\sum_{i=11}^{2^5-1=7} X_{ij} = X_{11} + X_{21} + X_{31} + X_{41} + X_{51} + X_{61} + X_{71} = \leq 1$$

This means that either all of the $X_{11}$, $X_{21}$, $X_{31}$, $X_{41}$, $X_{51}$, $X_{61}$, $X_{71}$ values are 0, or only one of these values is 1 and the rest are 0. A 0 value means a pseudo sensor is not assigned to a corresponding target, while a 1 value means that it is assigned to the corresponding target. The constraint of equations 8 and 0 may be evaluated, as shown by the example for J(2) where J(2)={2, 4, 6, 7}] as follows. In this evaluation the basic sensor 2 may be used alone to form pseudo sensor 2 or in combination with other sensors to form the pseudo sensors 4, 6 and 7. For this example then:

$$\sum_{i \epsilon J(2)} \sum_{j=1}^{t=5} X_{ij} = \sum_{j=1}^{5} X_{2j} + \sum_{j=1}^{5} X_{4j} + \sum_{j=1}^{5} X_{6j} + \sum_{j=1}^{5} X_{7j} =$$

$$= X_{21} + X_{22} + X_{23} + X_{24} + X_{25} +$$
$$X_{41} + X_{42} + X_{43} + X_{44} + X_{45} +$$
$$X_{61} + X_{62} + X_{63} + X_{64} + X_{65} +$$
$$X_{71} + X_{72} + X_{73} + X_{74} + X_{75} \leq \tau_2 = 2$$

where 2 is a physical constraint that means the number of targets that pseudo sensor 2 can track is a maximum of 2 targets.

Equation (7) fixes each j and sums over the pseudo sensors. The fact that this is constrained to be less than or equal to "1" means that only one or none of the pseudo sensors will be assigned to target j. Equation (6) sums the $G_{ij}$ values for which there is a pseudo sensor assigned because the $x_{ij}$ values are "0" or "1" if the $\tau_k$ are integers. Equation (8), by virtue of the sets J(k), insures that the number of targets tracked by the assigned pseudo sensors does not exceed the maximum tracking capacity of a basic sensor k. If there are more targets than the total tracking capacity, then Equation (7) allows some targets do not have pseudo sensors assigned to them.

Following the determination optimal assignment of pseudo sensors to tracks, assignment is made in step 20. The assignment of tracks in step 20 allows updating of the Kalman filter in step 22 in accordance with known processing steps. After updating of the Kalman filter, predicted track errors and positions, the information gain is calculated for each sensor target cell of the matrix by known means by the computer in step 24. The process continues on a real-time basis, as information from the sensors continues to be provided to the system. Each time through the loop (i.e., each new calculation cycle) a new assignment of pseudo sensors to targets may be accomplished.

Examples of optimization. Some simple examples will illustrate the concept. They are based on three basic sensors and five targets.

With three basic sensors, s=3, and $2^{s-1}=7$. Let S1, S2, S3, S4, S5, S6, and S7 be the designations of all of the pseudo sensors with S4={S1,S2}, S5={S1,S3}, S6={S2,S3}, and S7={S1,S2,S3}. The integer sets J(k) then contain $2^{3-1}=4$ integers and are then: J(1)={1,4,5,7}, J(2)={2,4,6,7}, J(3)={3,5,6,7}.

Example 1

Information gains are calculated according to a model in which the five targets are one-dimensional state vectors with initial P, Q, R covariance matrices for Kalman filters (actually variances) given by $$P=(0.5, 0.4, 0.35, 0.3, 0.25); \tag{10}$$

the covariance matrices (variances) of the three sensors are $$R=(0.35, 0.18, 0.25); \tag{11}$$

and the covariance matrices (variances) of the target process noises are $$Q=(0.2, 0.25, 0.3, 0.35, 0.4) \tag{12}$$

The updated target covariance matrix (variance) is $1/P(new;j,i)=1/(P(old;j)+Q(j))+1/R(i)$ if target j is to be observed by sensor i, and $P(new;j,0)=P(old;j)+Q(j)$ if the target is not going to be observed. The information gains achievable by assigning pseudo sensor i to target j are then (it will not alter the solution if we suppress the multiplier ½)

$$G_{ij} = \ln \left[ \frac{|P(new;j,0)|}{|P(new;j,i)|} \right]. \tag{13}$$

In all the cases covered, the integer sets J(k) used in equation (8) are as in Example 1. The solutions may be obtained by using linear programming and the Mathematica ™ software program, which is illustrated in the Appendix. (Note in the Appendix that the term "sensor" is used instead of the term "pseudo sensor" to represent a group of basic sensors, as well as the basic sensors.) The optimal assignments are indicated in boldface type.

Case 1. The maximum tracking capacities are 2 for S1, 1 for S2, and 1 for S3. The information gain matrix is derived from Table II.

TABLE II

|    | T1    | T2      | T3    | T4      | T5      | τi |
|----|-------|---------|-------|---------|---------|----|
| S1 | 1.099 | 1.050 | 1.050 | 1.050 | 1.050 | 2  |
| S2 | 2.079 | 2.015 | 2.015 | 2.015 | 2.015 | 1  |
| S3 | 0.773 | 0.734 | 0.734 | 0.734 | 0.734 | 1  |
| S4 | 2.303 | 2.236 | 2.236 | 2.236 | 2.236 |    |
| S5 | 1.427 | 1.371 | 1.371 | 1.371 | 1.371 |    |
| S6 | 2.216 | 2.150 | 2.150 | 2.150 | 2.150 |    |
| S7 | 2.413 | 2.346 | 2.346 | 2.346 | 2.346 |    |

A count shows the maximum tracking constraints are met. The information gain for this optimal assignment is 4.913 nepers. The new P-vector (in general this would be a set of covariance matrices) is P={0.0764, 0.2275, 0.65, 0.65, 0.65}. The small t column is not part of the pseudo sensor/target array. It is used to indicate the maximum number of targets a given sensor on the same row can track.

Case 2. If more tracking capacity is allowed than there are targets, e.g., the maximum tracking capacities are 2 each for S1, S2, and S3, then the information gain matrix is derived from Table III.

TABLE III

|    | T1    | T2      | T3      | T4      | T5      | τ |
|----|-------|---------|---------|---------|---------|---|
| S1 | 1.099 | 1.050   | 1.050   | 1.050   | 1.050 | 2 |
| S2 | 2.079 | 2.015 | 2.015 | 2.015 | 2.015 | 2 |
| S3 | 0.773 | 0.734 | 0.734 | 0.734 | 0.734 | 2 |
| S4 | 2.303 | 2.236 | 2.236 | 2.236 | 2.236 |   |
| S5 | 1.427 | 1.371 | 1.371 | 1.371 | 1.371 |   |
| S6 | 2.216 | 2.150 | 2.150 | 2.150 | 2.150 |   |
| S7 | 2.413 | 2.346 | 2.346 | 2.346 | 2.346 |   |

Again, it is clear that the maximum tracking capacity constraints are met. The information gain for this case is 7.249 nepers. The resulting value of the P-vector is P={0.0875, 0.3120, 0.1650, 0.0867, 0.2275}.

Example 2

When track probabilities are known, you can let p(T) be the probability of track T at step k. In a multi-hypothesis algorithm, this is the sum of the hypothesis probabilities of all the hypotheses containing the track. Let f(x;T) be the density function of track T when, as used above, track probabilities were not considered. Then the probability density f(x,;T) of track T taking track probability into consideration is the product of f and P:

$$f(x;T)=p(T)f(x;T) \tag{14}$$

The information content of a track T is then $$I(\tilde{f};\lambda)= \int d\tilde{x}\tilde{f}(\tilde{x};T) \ln [\tilde{f}(\tilde{x};T)/\lambda]= \int d\tilde{x}p(T)f(\tilde{x};T) \ln$$
$$p(T)+ \int d\tilde{x}p(T)f(\tilde{x};t) \ln [f(\tilde{x};T)/\lambda]. \tag{15}$$

The gain in information in the probability case is then $$G = \frac{1}{2} p(T) \ln \left[ \frac{|P_0|}{|P_1|} \right]. \tag{16}$$

In this example, equation (12) is used to compute the entries of the gain matrix. The maximum tracking capacities are 2 for S1, 1 for S2 and 1 for S3. The track probabilities used are

P(T1)=0.81

P(T2)=0.76

P(T3)=0.73

P(T4)=0.47

P(T5)=0.23

The gain matrix is derived from Table IV.

TABLE IV

|    | T1    | T2      | T3      | T4      | T5    | τ |
|----|-------|---------|---------|---------|-------|---|
| S1 | 0.890 | 0.798 | 0.766 | 0.493 | 0.241 | 2 |
| S2 | 1.684 | 1.531 | 1.471 | 0.947 | 0.463 | 1 |
| S3 | 0.626 | 0.558 | 0.536 | 0.345 | 0.169 | 1 |
| S4 | 1.865 | 1.699 | 1.632 | 1.051 | 0.514 |   |
| S5 | 1.156 | 1.042 | 1.001 | 0.645 | 0.315 |   |
| S6 | 1.795 | 1.634 | 1.569 | 1.010 | 0.494 |   |
| S7 | 1.954 | 1.783 | 1.712 | 1.102 | 0.540 |   |

Comparing this with Example 2, Case 1, we see that T5 did not receive a pseudo sensor assignment in the present example, but T3 was assigned instead. The difference was caused by the low probability of track five and the resultant lowered gain terms. The new P-vector is P=0 . . . 0.0875, 0.2275, 0.312, 0.65. The information gain is 3.953 nepers.

APPENDIX

```
(* this is a three sensor, five target problem *)
(* by commenting out certain code this will do *)
(* different max tracking capacities and also handle *)
(* probability case *)
P={.5,.4,.35,.3,.45};
R={.25,.18,.35};
Q={.2,.2,.2,.2,.2};
(* P is the vector of initial track variances*)
(* R is the vector of sensor variances for the 3 sensors*)
(* Q is the vector of the 5 track process noise variances*)
(* the updated track variance when assigning sensor i to *)
(* track j is (1/P0[[j]]+(1/R[[i]]) *)
(* sparti is the partial calculation of the information*)
(* gains due to sensor i *)
P0=Table[P[[j]]+Q[[j]],{j,5}];
(* P0 is the vector of track variance updates if no*)
(* sensor is applied to track j *)
(* si is the row vector of arguments used in the *)
(* calculation of information gain obtained by *)
(* assigning sensor i to track j *)
spart1=Table[(1/P0[[j]])+(1/R[[1]]),{j,5}];
spart2=Table[(1/P0[[j]])+(1/R[[2]]),{j,5}];
spart3=Table[(1/P0[[j]])+(1/R[[3]]),{j,5}];
(* sensors 4,5,6,7 are combinations of sensors 1,2, and 3*)
(* thus sensor 4 is sensor 1 and sensor 2, and the update*)
(* involves adding (1/R[[1]]+1/R[[2]] to 1/P0[[j]]*)
(* similarly for sensors 5,6 and 7*)
spart4=Table[(1/P0[[j]])+(1/R[[1]] +1/R[[2]]),{j,5}];
spart5=Table[(1/P0[[j]])+(1/R[[1]] +1/R[[3]]),{j,5}];
spart6=Table[(1/P0[[j]])+(1/R[[2]] +1/R[[3]]),{j,5}];
spart7=Table[(1/P0[[j]])+(1/R[[1]] +1/R[[2]]+1/R[[3]]),{j,5}];

s1=Table[P0[[j]] spart1[[j]],{j,5}];
s2=Table[P0[[j]] spart2[[j]],{j,5}];
s3=Table[P0[[j]] spart3[[j]],{j,5}];
s4=Table[P0[[j]] spart4[[j]],{j,5}];
s5=Table[P0[[j]] spart5[[j]],{j,5}];
s6=Table[P0[[j]] spart6[[j]],{j,5}];
s7=Table[P0[[j]] spart7[[j]],{j,5}];
(* lni is the natural log of si, it is the information *)
(* gain without the factor 1/2 *)
ln1=Log[s1]
ln2=Log[s2]
ln3=Log[s3]
ln4=Log[s4]
```

```
ln5=Log[s5]
ln6=Log[s6]
ln7=Log[s7]
(*this is for probability case*)
prb={.81,.76,.73,.47,.23}
prb1=prb ln1
prb2=prb ln2
prb3=prb ln3
prb4=prb ln4
prb5=prb ln5
prb6=prb ln6
prb7=prb ln7
In1=-prb1;
In2=-prb2;
In3=-prb3;
In4=-prb4;
In5=-prb5;
In6=-prb6;
In7=-prb7;
zro={0,0,0,0,0};
neg1={-1,-1,-1,-1,-1};
n1={-1,0,0,0,0};
n2={0,-1,0,0,0};
n3={0,0,-1,0,0};
n4={0,0,0,-1,0};
n5={0,0,0,0,-1};
b={-2,-2,-2,-1,-1,-1,-1,-1};
r1=Flatten[{neg1,zro,zro,neg1,neg1,zro,neg1}];
r2=Flatten[{zro,neg1,zro,neg1,zro,neg1,neg1}];
r3=Flatten[{zro,zro,neg1,zro,neg1,neg1,neg1}];
r4=Flatten[{n1,n1,n1,n1,n1,n1,n1}];
r5=Flatten[{n2,n2,n2,n2,n2,n2,n2}];
r6=Flatten[{n3,n3,n3,n3,n3,n3,n3}];
r7=Flatten[{n4,n4,n4,n4,n4,n4,n4}];
r8=Flatten[{n5,n5,n5,n5,n5,n5,n5}];
m={r1,r2,r3,r4,r5,r6,r7,r8};
(*In1=-ln1;*)
(*In2=-ln2;*)
(*In3=-ln3;*)
(*In4=-ln4;*)
(*In5=-ln5;*)
(*In6=-ln6;*)
(*In7=-ln7;*)
c=Flatten[{In1,In2,In3,In4,In5,In6,In7}];
LinearProgramming[c,m,b]

{1.335, 1.22378, 1.16315, 1.09861, 1.28093}
{1.58697, 1.46634, 1.40009, 1.32914, 1.52847}
{1.09861, 0.998529, 0.944462, 0.887303, 1.04982}
{2.03978, 1.90707, 1.83347, 1.75402, 1.97562}
{1.75786, 1.63204, 1.56265, 1.48808, 1.69693}
{1.92991, 1.79966, 1.72757, 1.64988, 1.86691}
{2.27098, 2.13388, 2.05758, 1.97496, 2.20478}
```

{0.81, 0.76, 0.73, 0.47, 0.23}
{1.08135, 0.930069, 0.8491, 0.516348, 0.294615}
{1.28544, 1.11442, 1.02206, 0.624694, 0.351548}
{0.889876, 0.758882, 0.689457, 0.417033, 0.241459}
{1.65222, 1.44937, 1.33843, 0.824389, 0.454393}
{1.42386, 1.24035, 1.14073, 0.699396, 0.390293}
{1.56323, 1.36775, 1.26113, 0.775443, 0.429388}
{1.83949, 1.62175, 1.50203, 0.926232, 0.507099}
{0, 0, 0, 1, 0, 0, 0, 1, 0, 0, 0, 0, 0, 0, 0, 0, 0, 0, 0, 0, 0, 1, 0, 0, 0, 1, 0, 0, 0, 0, 0, 0, 0, 0, 0}

```
K=2;
info=Table[0,{K}];
targnum = 5;
sensnum = 7;
P={.5,.4,.35,.3,.45};
R={.25,.18,.35};
Q={.2,.25,.3,.35,.4};
info[[1]]=Sum[Abs[Log[P[[j]]]],{j,1,targnum}]/targnum;
(* P is the vector of initial track variances*)
(* R is the vector of sensor variances for the 3 sensors*)
(* Q is the vector of the 5 track process noise variances*)
(* the updated track variance when assigning sensor i to *)
(* track j is (1/P0[[j]]+1/R[[i]]) *)
(* sparti is the partial calculation of the information*)
(* gains due to sensor i; it is the reciprocal of the
variance due to assigning sensor i to track j *)
For[k=2;q=1,k<=K,k++,
q++;(*this is the index for info *)
P0=Table[P[[j]]+Q[[j]],{j,5}];(*watchout*)
(* P0 is the vector of track variance updates if no*)
(* sensor is applied to track j *)
(* si is the row vector of arguments used in the *)
(* calculation of information gain obtained by *)
(* assigning sensor i to track j *)
spart1=Table[(1/P0[[j]])+(1/R[[1]]),{j,5}];
spart2=Table[(1/P0[[j]])+(1/R[[2]]),{j,5}];
spart3=Table[(1/P0[[j]])+(1/R[[3]]),{j,5}];
(* sensors 4,5,6,7 are combinations of sensors 1,2, and 3*)
(* thus sensor 4 is sensor 1 and sensor 2, and the update*)
(* involves adding (1/R[[1]]+1/R[[2]] to 1/P0[[j]]*)
(* similarly for sensors 5,6 and 7*)
spart4=Table[(1/P0[[j]])+(1/R[[1]] +1/R[[2]]),{j,5}];
spart5=Table[(1/P0[[j]])+(1/R[[1]] +1/R[[3]]),{j,5}];
spart6=Table[(1/P0[[j]])+(1/R[[2]] +1/R[[3]]),{j,5}];
spart7=Table[(1/P0[[j]])+(1/R[[1]] +1/R[[2]]+1/R[[3]]),{j,5}];
s1=Table[P0[[j]] spart1[[j]],{j,5}];
s2=Table[P0[[j]] spart2[[j]],{j,5}];
s3=Table[P0[[j]] spart3[[j]],{j,5}];
s4=Table[P0[[j]] spart4[[j]],{j,5}];
s5=Table[P0[[j]] spart5[[j]],{j,5}];
s6=Table[P0[[j]] spart6[[j]],{j,5}];
s7=Table[P0[[j]] spart7[[j]],{j,5}];
```

```
spart=Flatten[{spart1,spart2,spart3,spart4,
          spart5,spart6,spart7}];
(* lni is the natural log of si, it is the information *)
(* gain without the factor 1/2 *)
ln1=Log[s1];
ln2=Log[s2];
ln3=Log[s3];
ln4=Log[s4];
ln5=Log[s5];
ln6=Log[s6];
ln7=Log[s7];

zro={0,0,0,0,0};
neg1={-1,-1,-1,-1,-1};
n1={-1,0,0,0,0};
n2={0,-1,0,0,0};
n3={0,0,-1,0,0};
n4={0,0,0,-1,0};
n5={0,0,0,0,-1};
b={-2,-1,-1,-1,-1,-1,-1,-1};
r1=Flatten[{neg1,zro,zro,neg1,neg1,zro,neg1}];
r2=Flatten[{zro,neg1,zro,neg1,zro,neg1,neg1}];
r3=Flatten[{zro,zro,neg1,zro,neg1,neg1,neg1}];
r4=Flatten[{n1,n1,n1,n1,n1,n1,n1}];
r5=Flatten[{n2,n2,n2,n2,n2,n2,n2}];
r6=Flatten[{n3,n3,n3,n3,n3,n3,n3}];
r7=Flatten[{n4,n4,n4,n4,n4,n4,n4}];
r8=Flatten[{n5,n5,n5,n5,n5,n5,n5}];
m={r1,r2,r3,r4,r5,r6,r7,r8};
In1=-ln1;
In2=-ln2;
In3=-ln3;
In4=-ln4;
In5=-ln5;
In6=-ln6;
In7=-ln7;
c=Flatten[{In1,In2,In3,In4,In5,In6,In7}];
y=LinearProgramming[c,m,b];
wlong=Count[y,1];
w=Table[0,{wlong}];

For[v=1;z=1,v<=35,v++,
      If[y[[v]]==0,,w[[z]]=v;z++]];
x = Table[{,},{wlong}];
For[a=1;count = 1,a<=z-1,a++,
      If[w[[a]]!=0,g=w[[a]]/5;
            If[IntegerQ[g],i=g;j=5,
                  f=Floor[g];i=f+1;j=Mod[w[[a]],5]]];
  x[[count,1]] = i;
  x[[count,2]] = j;
  count++;
]

xlength=Length[x];
```

```
targsensd=Table[0,{targnum}]
Do[targsensd[[x[[i,2]]]]=1,{i,xlength}];
targsensd;

Do[ If[targsensd[[t]]==0,P[[t]]=P0[[t]],]
        ,{t,targnum}
    ];
Do[a=x[[t,2]];b=5 (x[[t,1]]-1)+x[[t,2]];
    P[[a]]=(spart[[b ]])^-1,{t,xlength}];
info[[q]]=Sum[Abs[Log[P[[j]]]],{j,1,targnum}]/targnum;
P;
]
info
spart;
P0;
x;
targsensd;
w;
```

I claim:

1. A sensing system for optimizing the allocation of sensors to targets that are being tracked by the system on a continuing basis comprising, a plurality of basic sensors arranged into sensor groups so that a separate pseudo sensor group is formed by each basic sensor and by each possible combination of said basic sensors, a Kalman filter which provides track covariance matrix vector data for each target which is dependent on state vector data being tracked for predicting track errors and the position of its associated target, a programmable digital computer controllable by software code coupled to said Kalman filter for receiving available basic sensor data, basic sensor capacity data and basic sensor error input data target state vector data and Kalman filter covariance matrix data, a first software process for causing said computer to calculate information gain of said system for each pseudo sensor and target assignment on a continuing basis as a function of the ratio of the covariance matrix data of each associated Kalman filter when state vector data of the associated target is observed to the covariance matrix data of each associated Kalman filter when state vector of the associated target is not observed, a second software process that utilizes mathematical linear programming to maximize the relative information gain in a calculation cycle in which the state vectors and the gain values for each possible combination of said sensors and said targets are calculated, namely:

$$\text{maximize } C = \sum_{i=1}^{2^s-1} \sum_{j=1}^{t} G_{ij} x_{ij}.$$

where C is relative gain, $G_{ij}$ is the information gain of a track j and sensor i, and $X_{ij}$ is the state vector for each track j and sensor i, and said second software code imposes the first constraint, $$\sum_{i=1}^{2^s-1} x_{ij} \leq 1 \text{ for } j = 1, \ldots, t$$

$$x_{ij} \geq 0 \text{ for all pairs } ij$$

where S is the number of basic sensors and $2^s-1=\tau$, and to the second constraint $$\sum_{i \in J(k)} \sum_{j=1}^{t} x_{ij} \leq \tau_k \text{ for } k = 1, \ldots, s$$

where $\tau_k$ is the maximum tracking capacity of the basic sensor k, i∈ J(k) means i is a subset of J(k), and J(k) represents the set of all pseudo sensors that include the basic sensor k, and control means for utilizing said basic sensors as selected combinations of pseudo sensors formed of one or more basic sensors on a continuing basis after each information gain calculation which is coupled to said computer and to said pseudo sensors for recombining said sensors with said targets in response to the maximization value, c, of said relative gain that is obtained after each information gain calculation.

* * * * *